United States Patent
Rico Alvarino et al.

(10) Patent No.: US 10,856,310 B2
(45) Date of Patent: Dec. 1, 2020

(54) RETUNING IN MACHINE TYPE COMMUNICATIONS

(71) Applicant: QUALCOMM Incorporated, San Diego, CA (US)

(72) Inventors: Alberto Rico Alvarino, San Diego, CA (US); Kapil Bhattad, Bangalore (IN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 544 days.

(21) Appl. No.: 15/711,810

(22) Filed: Sep. 21, 2017

(65) Prior Publication Data

US 2018/0227937 A1 Aug. 9, 2018

(30) Foreign Application Priority Data

Feb. 3, 2017 (IN) .............................. 201741004049

(51) Int. Cl.
*H04W 72/12* (2009.01)
*H04L 5/00* (2006.01)
(Continued)

(52) U.S. Cl.
CPC ....... *H04W 72/1263* (2013.01); *H04L 5/0007* (2013.01); *H04L 5/0044* (2013.01); *H04L 5/0053* (2013.01); *H04W 72/0453* (2013.01); *H04L 5/0048* (2013.01); *H04W 4/70* (2018.02); *H04W 72/042* (2013.01)

(58) Field of Classification Search
None
See application file for complete search history.

(56) References Cited

U.S. PATENT DOCUMENTS

| 5,526,359 A * | 6/1996 | Read ................. H04J 3/0685 370/516 |
| 6,690,853 B1 * | 2/2004 | Alaimo ............. G02B 6/29307 385/10 |

(Continued)

FOREIGN PATENT DOCUMENTS

| EP | 3282627 A1 | 2/2018 |
| WO | 2016163805 A1 | 10/2016 |

(Continued)

OTHER PUBLICATIONS

International Search Report and Written Opinion—PCT/US2018/013732—ISA/EPO—dated Jun. 7, 2018.

*Primary Examiner* — Gregory B Sefcheck
(74) *Attorney, Agent, or Firm* — Patterson & Sheridan, LLP

(57) ABSTRACT

Certain aspects of the present disclosure relate to methods and apparatus for applying rules to determine when to retune radio components of a user equipment (UE). Certain aspects of the present disclosure provide a method for wireless communications by a UE. The method includes determining first resources assigned to the UE in a first subframe and second resources assigned to the UE for uplink transmissions in a second subframe. The method further includes determining whether to retune radio frequency (RF) circuitry prior to transmitting in the second subframe based on at least one rule involving an overlap between the first resources and second resources.

37 Claims, 15 Drawing Sheets

(51) Int. Cl.
 *H04W 72/04* (2009.01)
 *H04W 4/70* (2018.01)

(56) References Cited

U.S. PATENT DOCUMENTS

| | | | | |
|---|---|---|---|---|
| 7,047,006 | B2* | 5/2006 | Classson | H04L 5/0037 455/434 |
| 7,342,904 | B2* | 3/2008 | Sun | H04B 1/707 370/335 |
| 8,914,019 | B1* | 12/2014 | Choi | H04W 72/048 455/422.1 |
| 9,148,890 | B1* | 9/2015 | Choi | H04W 72/048 |
| 9,172,515 | B2* | 10/2015 | Chaudhuri | H04W 52/243 |
| 9,271,185 | B2* | 2/2016 | Abdelmonem | H04L 5/0026 |
| 9,294,241 | B2* | 3/2016 | Chaudhuri | H04W 52/243 |
| 9,425,930 | B2* | 8/2016 | Chaudhuri | H04W 52/243 |
| 9,438,458 | B1* | 9/2016 | Santa | H04L 5/001 |
| 9,467,200 | B2* | 10/2016 | Sun | H04B 1/707 |
| 9,572,106 | B2* | 2/2017 | Ang | H04W 52/0206 |
| 9,591,653 | B2* | 3/2017 | He | H04W 4/70 |
| 9,706,482 | B2* | 7/2017 | Gulati | H04W 48/16 |
| 9,716,988 | B2* | 7/2017 | Vos | H04W 4/70 |
| 9,756,649 | B2* | 9/2017 | He | H04W 4/70 |
| 9,900,913 | B2* | 2/2018 | Lu | H04W 74/0833 |
| 10,200,872 | B2* | 2/2019 | Sakhnini | H04L 27/265 |
| 10,506,591 | B2* | 12/2019 | Rico Alvarino | H04W 4/70 |
| 10,575,303 | B2* | 2/2020 | Rico Alvarino | H04W 72/0453 |
| 2008/0076432 | A1* | 3/2008 | Senarath | H04W 36/18 455/442 |
| 2009/0257420 | A1* | 10/2009 | Kore | H04B 1/713 370/345 |
| 2014/0071961 | A1* | 3/2014 | Nigam | H04W 72/042 370/336 |
| 2014/0241261 | A1* | 8/2014 | Ratasuk | H04W 72/0453 370/329 |
| 2014/0341179 | A1* | 11/2014 | Yokomakura | H04L 5/0037 370/330 |
| 2015/0029893 | A1* | 1/2015 | Gulati | H04W 48/16 370/254 |
| 2016/0066315 | A1* | 3/2016 | Zhang | H04W 72/1226 370/329 |
| 2016/0105803 | A1* | 4/2016 | Sakhnini | H04L 27/265 455/45 |
| 2016/0127936 | A1 | 5/2016 | Chatterjee et al. | |
| 2016/0242152 | A1* | 8/2016 | Yu | H04W 76/14 |
| 2016/0249358 | A1* | 8/2016 | Li | H04W 72/0453 |
| 2016/0278070 | A1* | 9/2016 | Patel | H04L 5/0007 |
| 2016/0338062 | A1* | 11/2016 | Rico-Alvarino | H04W 72/0453 |
| 2016/0353476 | A1* | 12/2016 | Sartori | H04L 5/0005 |
| 2017/0070994 | A1* | 3/2017 | Rico Alvarino | H04W 4/70 |
| 2017/0079070 | A1* | 3/2017 | Lu | H04W 74/0833 |
| 2017/0118059 | A1* | 4/2017 | Santa | H04L 27/2647 |
| 2017/0208590 | A1 | 7/2017 | Kim et al. | |
| 2018/0098342 | A1* | 4/2018 | Jiang | H04W 28/12 |

FOREIGN PATENT DOCUMENTS

| | | |
|---|---|---|
| WO | 2016164865 A1 | 10/2016 |
| WO | 2016182291 A1 | 11/2016 |
| WO | 2017007937 A1 | 1/2017 |

* cited by examiner

Definition of widebands
- Up to 5MHz: One wideband comprising all the PRBs
- 10MHz: Two widebands
  - WB0=[NB0-NB3]
  - WB1=[NB4-NB7]
- 15MHz: Three widebands
  - WB0=[NB0-NB3]
  - WB1=[NB4-NB7 + center PRB]
  - WB2=[NB8-NB11]
- 20MHz: Four widebands
  - WB0=[NB0-NB3]
  - WB1=[NB4-NB7]
  - WB2=[NB8-NB11]
  - WB3=[NB12-NB17]

FIG. 9

RETUNING IN MACHINE TYPE COMMUNICATIONS

CROSS-REFERENCE TO RELATED APPLICATIONS

This application claims the benefit of Indian Application Serial No. 201741004049 entitled "RETUNING IN MACHINE TYPE COMMUNICATIONS," which was filed Feb. 3, 2017. The aforementioned application is herein incorporated by reference in its entirety.

FIELD

The present disclosure relates generally to communication systems, and more particularly, to methods and apparatus for determining when to re-tune radio components of a wireless device.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment. The method generally includes determining first resources assigned to the UE in a first subframe and second resources assigned to the UE for uplink transmissions in a second subframe and determining whether to retune radio frequency (RF) circuitry prior to transmitting in the second subframe based at least one rule involving an overlap between the first resources and second resources.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 9 illustrates example definitions of wideband regions, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
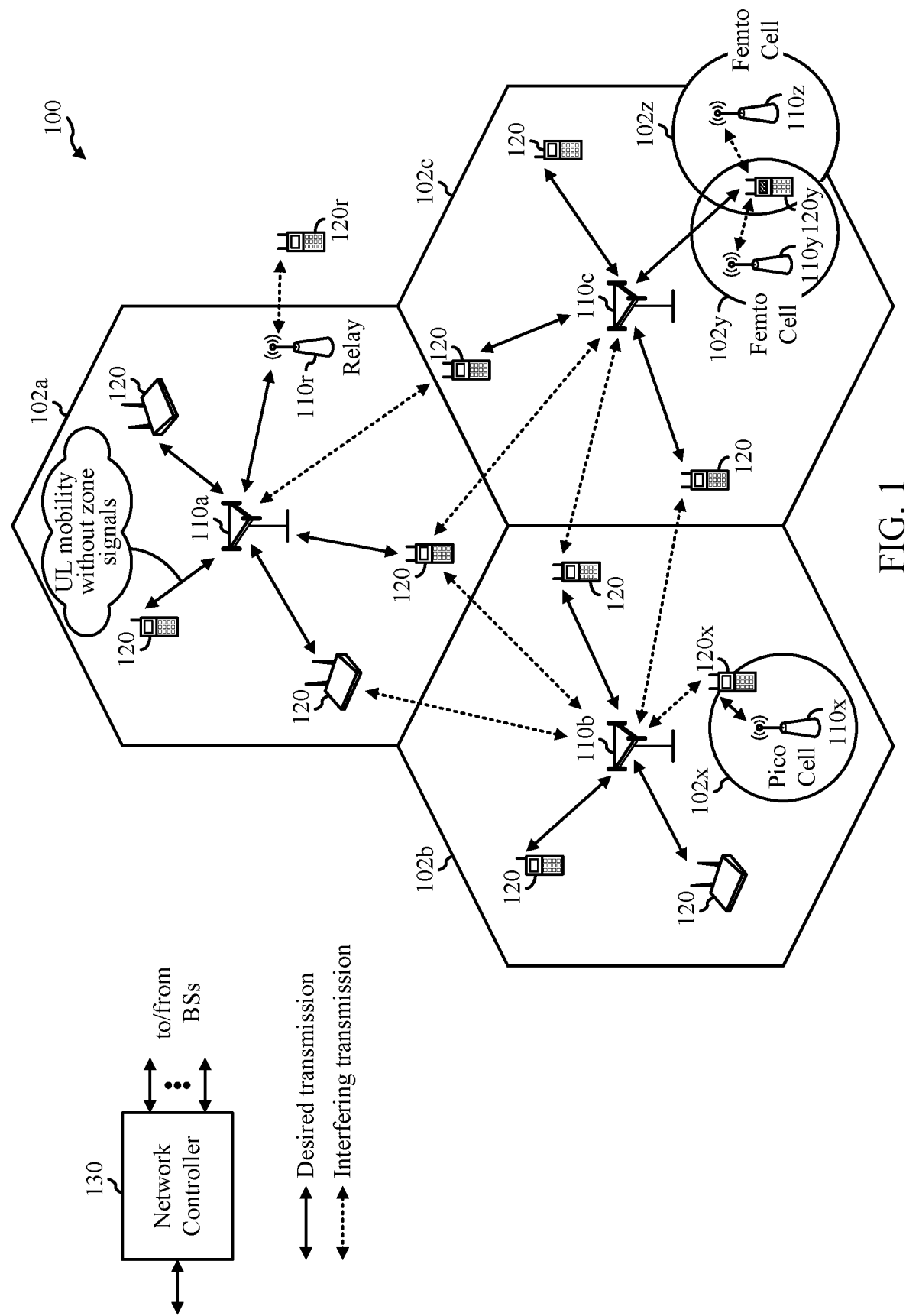
FIG. 1 is a block diagram conceptually illustrating an example telecommunications system, in accordance with certain aspects of the present disclosure.

Aspects of the present disclosure relate to rules that a UE may apply to determine when to retune radio components (e.g., phased lock loop, voltage controlled oscillator, and the like).

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame has a length of 10 ms and may consist of 2 half frames, each half frame consisting of 5 subframes. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
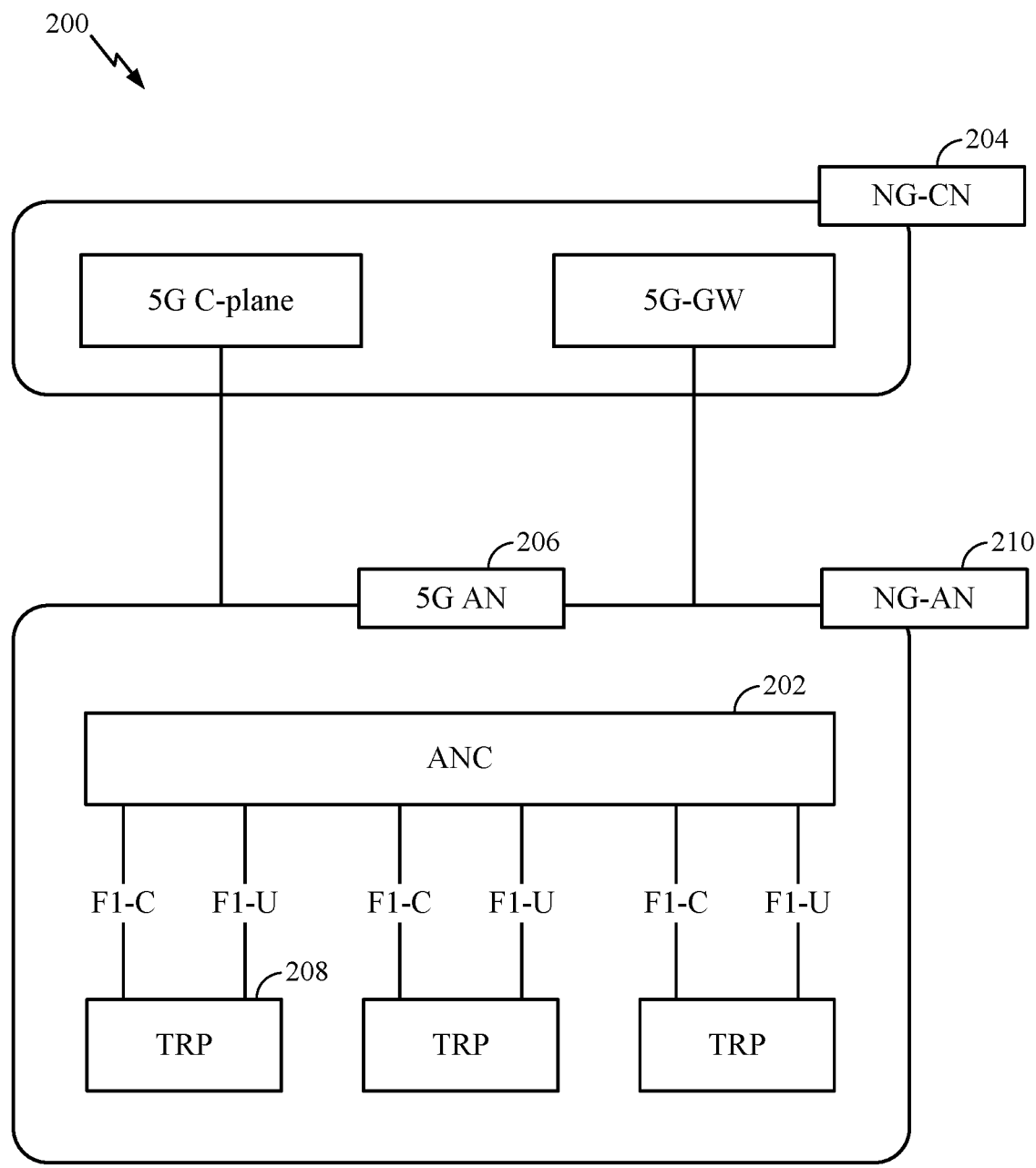
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
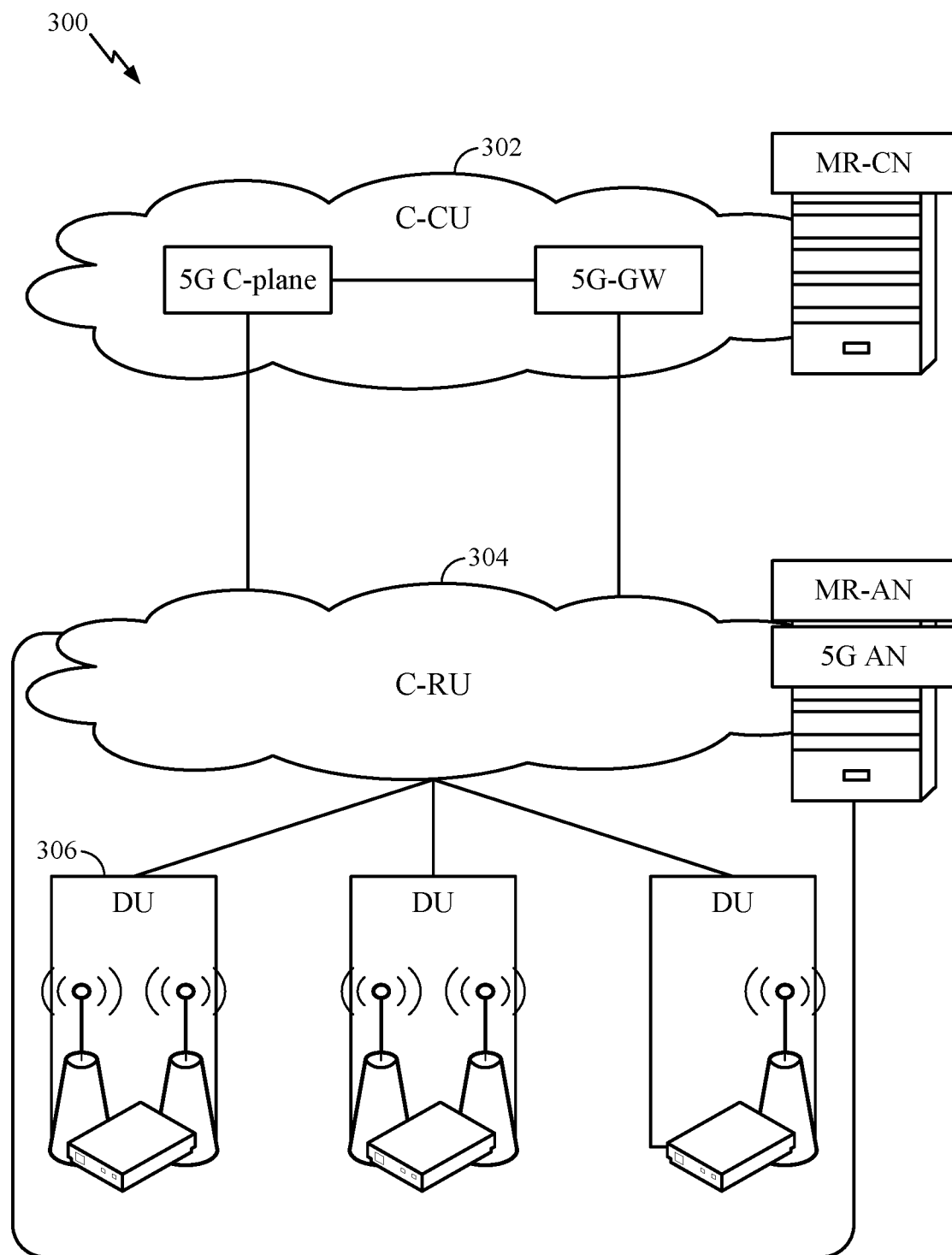
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
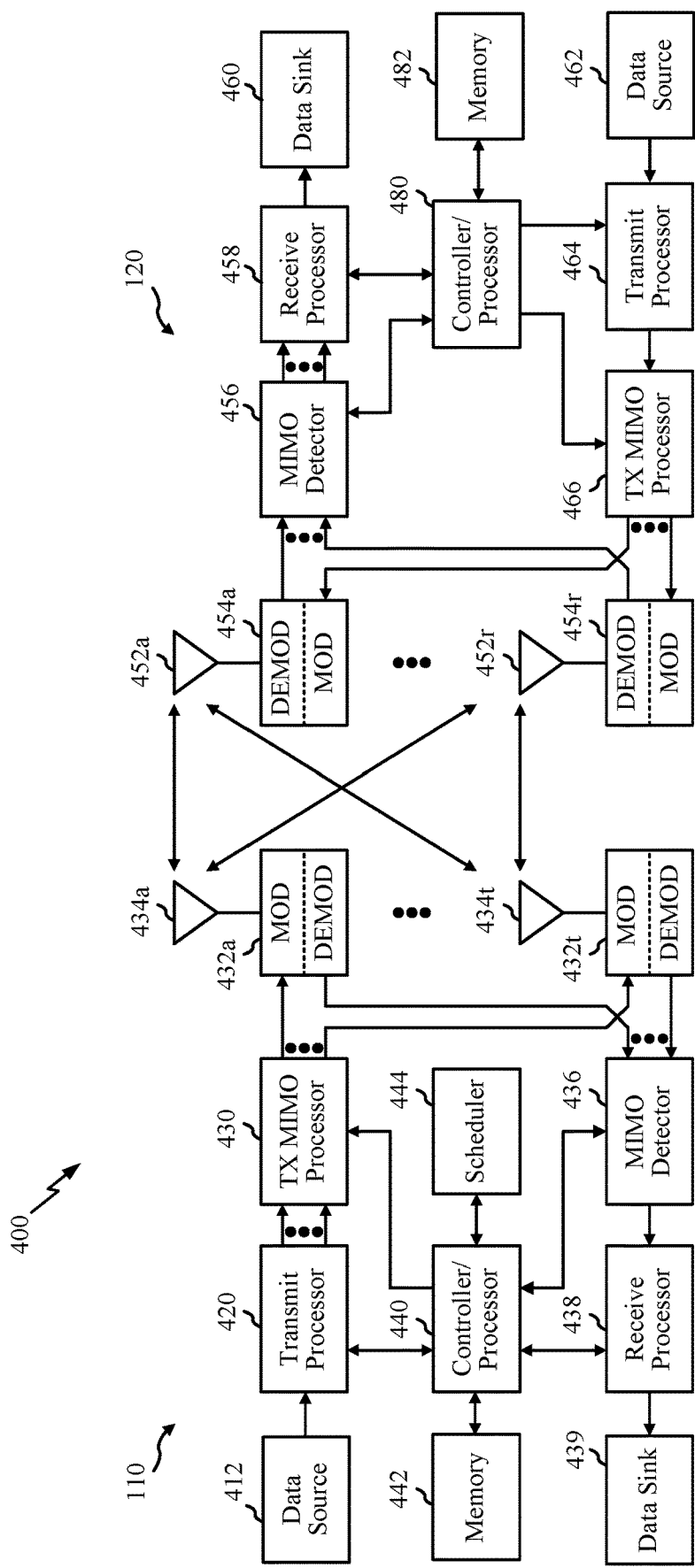
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 8.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 8, and/or other processes for the techniques described herein. The processor 480 and/or other processors and modules at the UE 120 may also perform or direct processes for the techniques described herein. The memories 442 and 482 may store data and program codes for the BS 110 and the UE 120, respectively. A scheduler 444 may schedule UEs for data transmission on the downlink and/or uplink.

Figure 5:
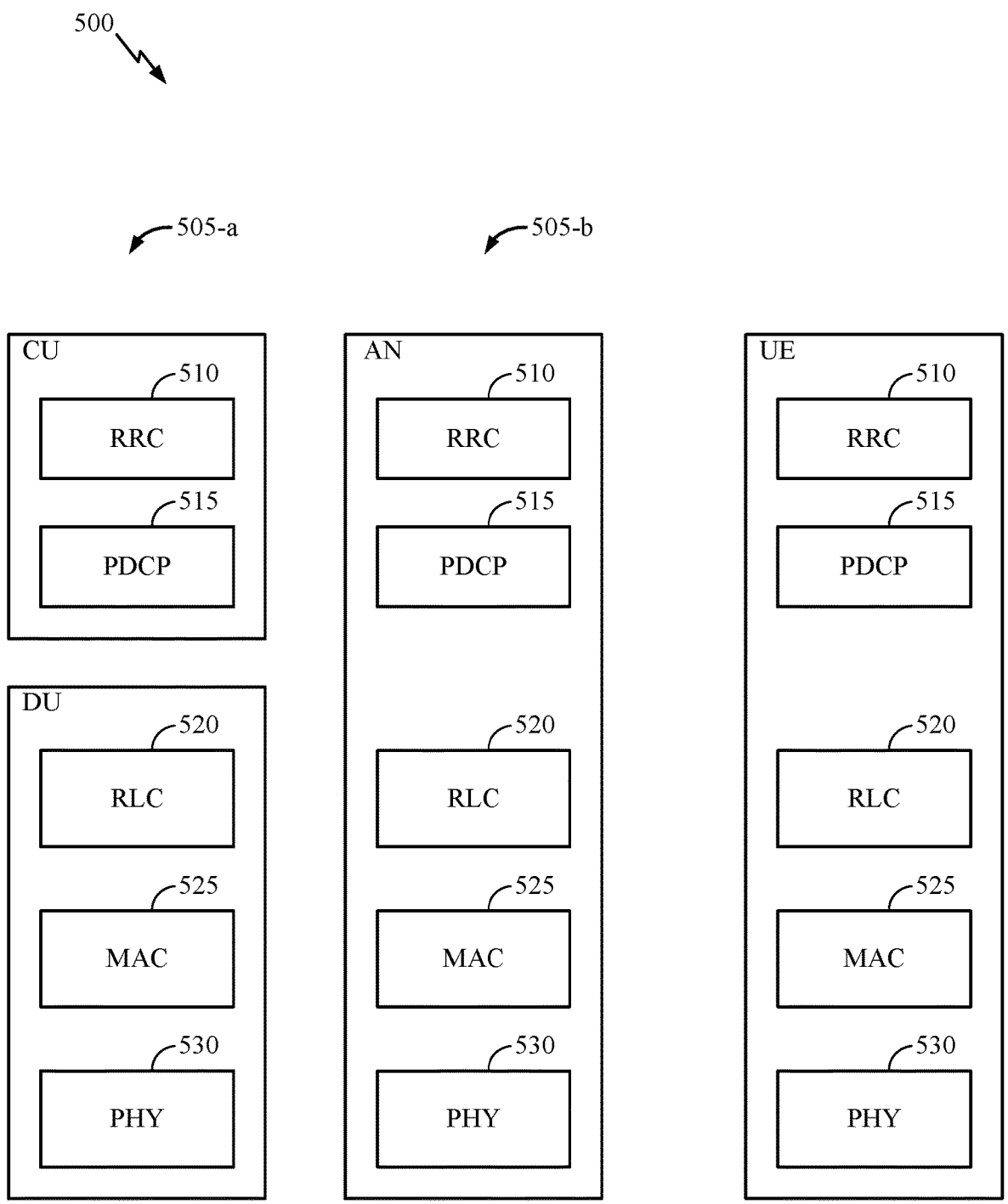
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
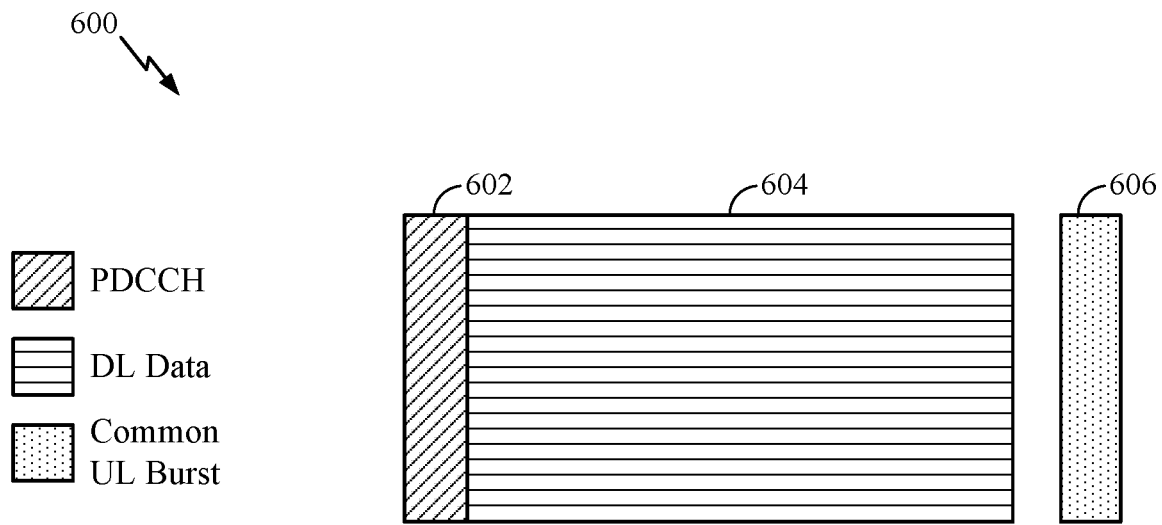
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
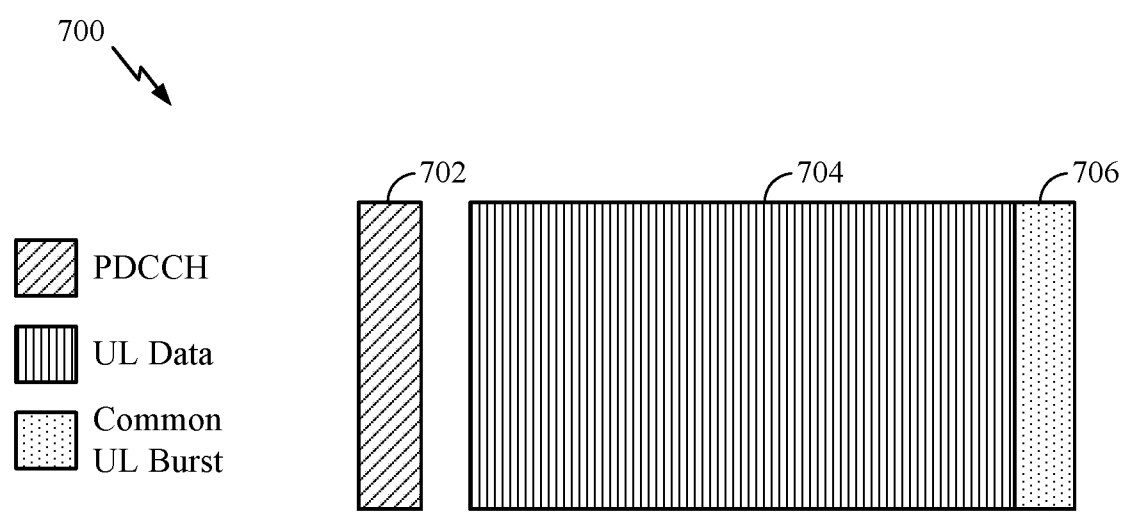
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL data portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Retuning in Machine Type Communications

In some cases, to support operating on different narrowbands, MTC devices may have to retune one or more of their radio components, such as frequency synthesizers, which may include a phase locked loop (PLL), with a voltage controlled oscillator (VCO). 3GPP's LTE Release 13 ("Rel-13") defines a set of retuning rules to be applied by MTC devices.

In Rel-13, a reduced bandwidth of 1.4 MHz bandwidth was designated for uplink and downlink communications by MTC devices, allowing for simpler radio implementation and lower device cost. With respect to retuning in FDD (i.e., frequency-division duplexing), Rel-13 mandated that if data is carried by PUSCH in two different narrowband frequency ranges (narrowbands or narrowband regions, interchangeably), two symbol durations may be used by the MTC device to retune. Similarly, two symbol durations may be used for retuning if the narrowbands are being switched for PUSCH to PUCCH transmissions, PUCCH to PUCCH transmissions, and PUSCH to PUSCH transmissions.

Rel-13 further specifies that for certain UEs, such as BL/CE UEs (i.e., bandwidth limited/coverage enhancement), the transmission of SRS may be dropped if retuning is required. As an example, let's assume a BL/CE UE (e.g., a MTC device) is scheduling an SRS transmission for subframe n while scheduling a PUSCH/PUCCH transmission for subframe n and/or n+1. In such an example, Rel-13 specifies that SRS shall not be transmitted (i.e., may be dropped) by the UE in subframe n if the SRS transmission narrowband in subframe n is not entirely within the narrowband used by the UE for the PUSCH/PUCCH transmission in subframe n and/or n+1 (i.e., if retuning is required).

In addition to the retuning and SRS dropping rules in FDD, Rel-13 designated retuning and SRS dropping rules for application under TDD (i.e. time-division duplexing). Under TDD, with respect to special subframes (e.g., for switching from downlink to uplink), Rel-13 specified that a BL/CE UE may not transmit SRS in UpPTS (Uplink Pilot Time Slot) if the narrowband to be used for UpPTS is different from the DwPTS (Downlink Pilot Time Slot) reception narrowband in the same special subframe (i.e., if retuning is required).

As described above, the retuning and SRS dropping rules in Rel-13 have been defined only in terms of narrowbands. However, 3GPP's LTE Rel-14 designated larger bandwidths for MTC devices. In Rel-14, a maximum bandwidth of 5 MHz/20 MHz has been specified for downlink communications. For uplink transmissions, a maximum bandwidth of 5 MHz was specified. In addition, Rel-14 further specified that different maximum bandwidths may be configured for uplink and downlink transmissions. For example, a 1.4 MHz bandwidth may be used for uplink transmissions while a 5 MHz bandwidth may be used for downlink transmissions.

As illustrated by the examples above, in Rel-13 the dropping rules were written in terms of narrowbands. Similar to Rel-13, Rel-14 transmissions/receptions may include a set of narrowbands. However, it is not clear if a set of wideband regions (widebands interchangeably), each including a set of narrowbands, should be defined for Rel-14. The term wideband may refer to a set of physical resource blocks wider than a narrowband, but smaller than or equal to the total system bandwidth. Due to the need of alignment between a UE and a base station (e.g. eNB), defining widebands may be more critical for uplink transmissions. For example, uplink allocation and retuning rules may be defined in terms of widebands while downlink may be defined in terms of PRBs or not defined at all.

Described below are a number of uplink transmissions retuning rules for when widebands are defined (FIG. 9) and a number of uplink transmissions retuning rules for when widebands are not defined (FIG. 10-15). The retuning rules defined below may be based on the assumption that one or two symbol durations are required for retuning.

Figure 8:
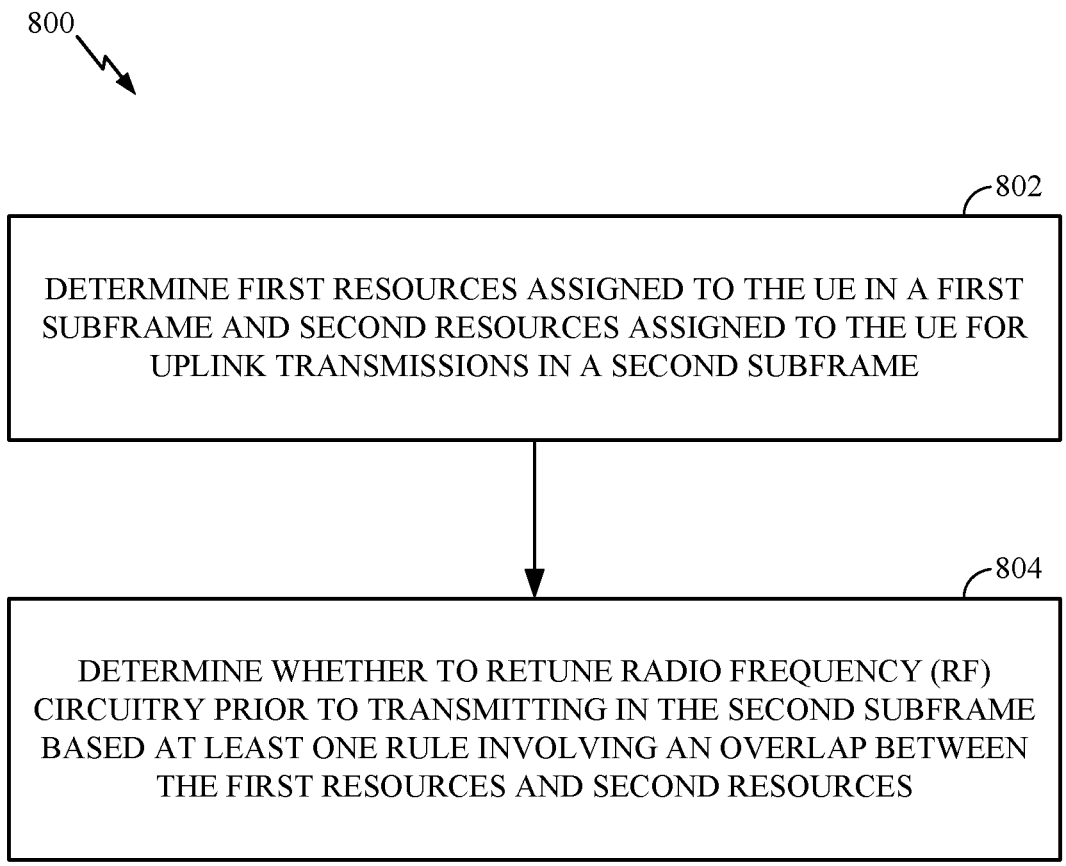
FIG. 8 example operations for wireless communications by a user equipment, in accordance with aspects of the present disclosure.

FIG. 8 illustrates example operations 800 for wireless communications by a user equipment, according to aspects of the present disclosure. Operations 800 may be performed, for example, by a user equipment.

Operations 800 begin, at 802, by determining first resources assigned to the UE in a first subframe and second resources assigned to the UE for uplink transmissions in a second subframe. At 804, the UE determines whether to retune radio frequency (RF) circuitry prior to transmitting in the second subframe based at least one rule involving an overlap between the first resources and second resources.

As discussed above, in some embodiments, a set of uplink transmissions retuning rules may be applied for when widebands are defined. FIG. 9 illustrates example definitions of wideband regions, in accordance with aspects of the present disclosure. As shown by FIG. 9, in some embodiments, a wideband region may span up to 5 MHz. In such embodiments, the one wideband region comprises all the PRBs. In some other embodiments, two wideband regions spanning up to 10 MHz may be defined. In such embodiments, each wideband region (e.g. WB0 or WB1) may include four narrowband regions (e.g. NB0-NB3 or NB4-NB7). In yet other embodiments, three wideband regions may be defined, whereby each wideband region may include four narrowband regions. In some embodiments, each narrowband region may include six PRBs, which translates into each wideband region having 24 PRBs. In other embodiments, a narrowband region may include six PRBs as well as an additional center PRB, which adds up to a total of 7 PRBs. For example, in FIG. 9, wideband region 1 (WB1), of the three wideband regions spanning up to 15 MHz, has a center PRB in addition to the 24 PRBs included in narrowband regions NB4-NB7. FIG. 9 also shows an example of defining four wideband regions spanning up to 20 MHz. It is important to note that wideband regions may be defined in other manners.

In embodiments where widebands are defined, as illustrated by FIG. 9, all the same retuning and SRS dropping rules that were defined by Rel-13 for narrowbands may instead apply to widebands under Rel-14. In some embodiments, the UE may be configured with different bandwidths for uplink and downlink transmissions. For example, a 1.4 MHz bandwidth may be defined for uplink transmissions while a 5 MHz bandwidth may be defined for downlink transmissions. In embodiments where the bandwidths for uplink and downlink transmission are different, at least two retuning rules may be defined for changing bandwidth from downlink to uplink. In some cases, these rules may only be defined for downlink to uplink transitions and not for uplink to downlink. For uplink to downlink transitions, it may be up to the UE implementation (i.e. no change in transmission).

For downlink to uplink bandwidth change, the first rule is to always apply retuning. The second rule is that no retuning needs to be applied if the center of the uplink transmission bandwidth (e.g. 1.4 MHz, as described above) is the same as the center of the downlink transmission bandwidth (e.g. 5 MHz).

Moving now to embodiments where widebands are not defined, where an assignment may contain more than one wideband, or where widebands are defined but only for retuning purposes, FIGS. 10 through 16 describe various retuning rules to be applied in various embodiments.

Figure 10:
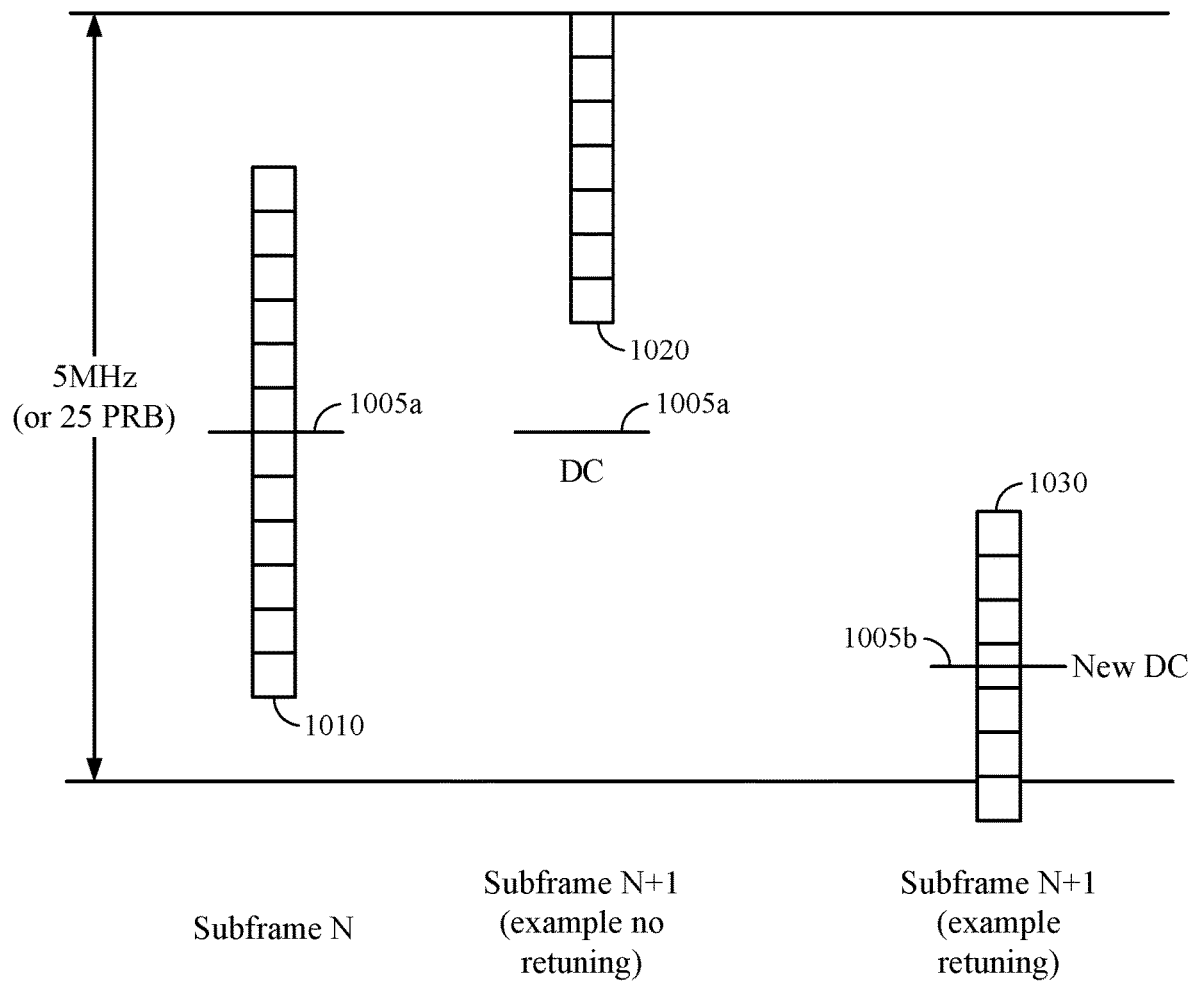
FIGS. 10-16B illustrate different rules for retuning, in accordance with aspects of the present disclosure.

FIG. 10 illustrates an exemplary retuning rule for embodiments where the UE puts the DC (i.e. direct current) in the PUSCH assignment in a first assignment in subframe n, in accordance with aspects of the present disclosure. In such embodiments, a retuning rule may specify that retuning needs to be applied if the assignment in subframe n+1 is not contained in the 5 MHz bandwidth centered in the DC (although, the DC in subframe n+1 may change depending on whether the UE received the grant in subframe n or not).

For example, as shown in FIG. 10, DC 1005a is placed at the center of assigned resources 1010 in subframe n. FIG. 10 further illustrates an example of assigned resources 1020 in subframe n+1 that is contained within the 5 MHz bandwidth centered in DC 1005a. In such embodiments, as described above, there may be no retuning and no change in DC 1005a. However, when one or more PRBs of an assignment, such as assigned resources 1030, are not contained within the 5 MHz bandwidth centered in 1005a, retuning may be performed and the DC may be changed from DC 1005a to DC 1005b, as shown in FIG. 10.

Figure 11A:
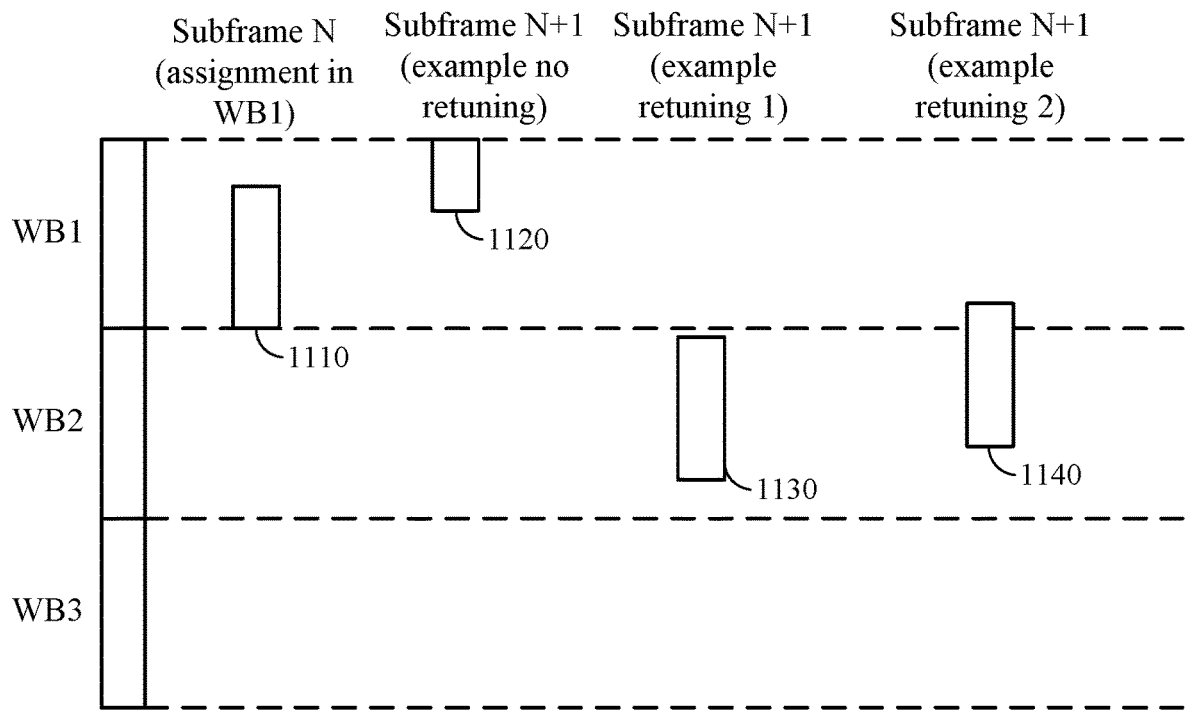
Figure 11B:
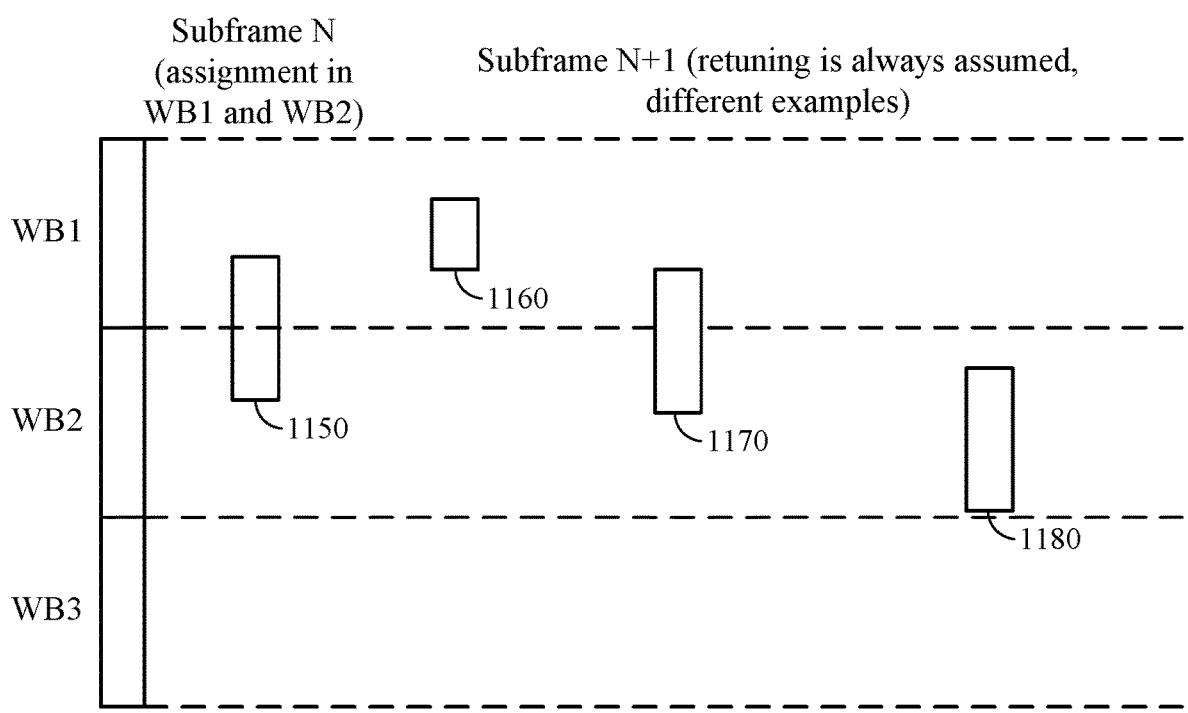

FIGS. 11A and 11B illustrate exemplary retuning rules for embodiments where widebands are defined but only for retuning purposes (e.g. assignment can be across widebands), in accordance with aspects of the present disclosure.

FIG. 11A illustrates a retuning rule specifying that no retuning is applied if assignments in subframes n and n+1 are contained within the same wideband region. As shown in FIG. 11A, three wideband regions, WB1-WB3, have been defined only for retuning purposes. FIG. 11A shows one example of UE not applying retuning when the assignments in subframe n and n+1 are contained within the same wideband region. For example, as shown in FIG. 11A, there is no retuning when assigned resources 1120 in subframe n+1 are within the same wideband region WB1 as assigned resources 1110 in subframe n. FIG. 11A also illustrates two examples of applying retuning when the assignments in subframe n and n+1 are not contained within the same wideband region. For example, as shown in FIG. 11A, retuning is performed when one or more PRBs of an assignment, such as assigned resources 1130 or 1140, in subframe n+1 are not contained within the same wideband region WB1 as assigned resources 1110 in subframe n.

FIG. 11B illustrates an exemplary retuning rule specifying retuning is applied if at least one PRB of the assignment in subframe n belongs to a different wideband region than one PRB of the assignment in subframe n+1, in accordance with aspects of the present disclosure. More specifically, FIG. 11B illustrates assigned resources 1150 in subframe n that span two wideband regions WB1 and WB2. For example, as shown in FIG. 11B, some of the PRBs of assigned resources 1150 are contained within WB1 and others are contained within WB2. FIG. 11B further illustrates examples of retuning when at least one PRB of assigned resources in subframe n+1 (e.g., 1160, 1170, 1180) belongs to a different wideband region than one PRB of assigned resources 1150 in subframe n. For example, assigned resources 1160 include PRBs that belong to a wideband region (i.e., WB1) that is different than the wideband region (i.e., WB2) including one or more PRBs of assigned resources 1150.

Figure 12:
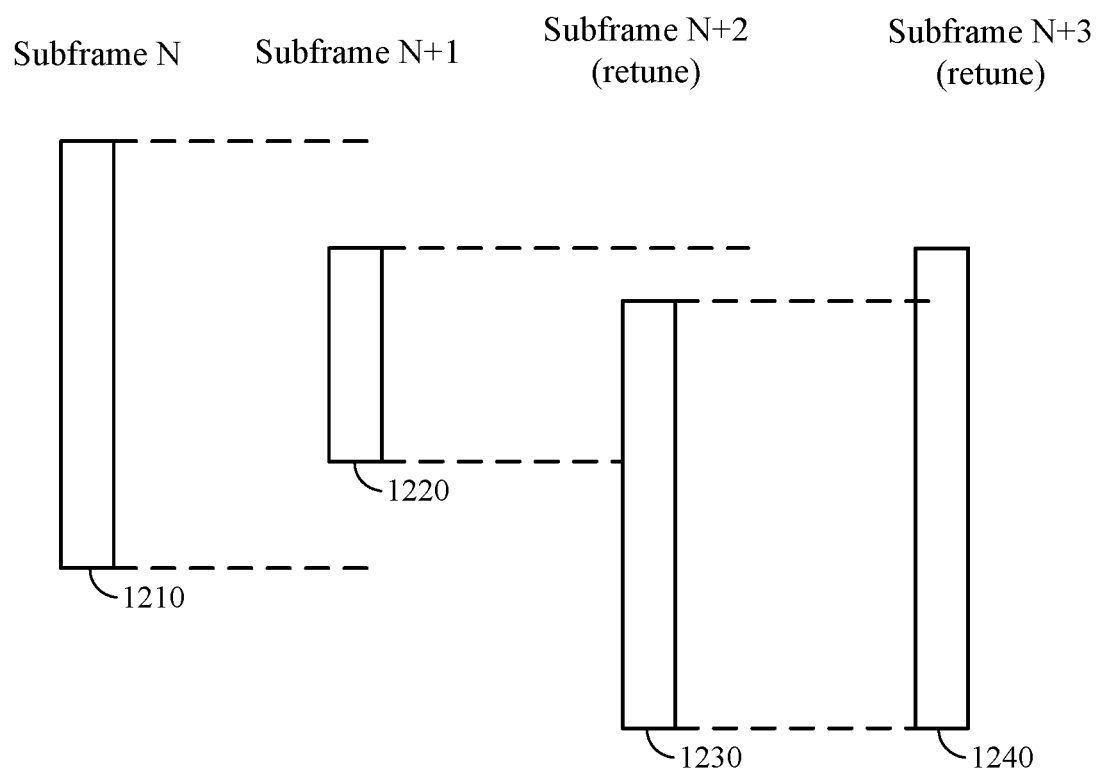

FIG. 12 illustrates an exemplary retuning rule specifying that retuning is applied if the assignment in subframe n+1 is not fully contained within the assignment in subframe n, in accordance with aspects of the present disclosure. The retuning rule illustrated by FIG. 12 allows the UE to run in narrowband mode for small assignments and open the radio frequency range only in instances where a larger assignment is received. In some cases, such a retuning rule may result in retuning when the allocation bandwidth increases, even when the assignments are within the same wideband region. In some embodiments, as shown in FIG. 12, whether an assignment is fully contained within another assignment may be measured in terms of PRBs. In other embodiments, as shown in FIG. 13, it may be measured in terms of narrowbands (i.e. whether the set of narrowband regions in subframe n+1 is contained within the set of narrowband regions in subframe n).

FIG. 12 shows an example where no retuning is performed when PRBs of assigned resources 1220 in subframe n+1 are contained within assigned resources 1210 of subframe n. FIG. 12 also shows an example where retuning is performed when PRBs of assigned resources 1230 in subframe n+2 are not contained within assigned resources 1210 of subframe n+1. Retuning is also performed when PRBs of assigned resources 1240 in subframe n+3 are not contained within assigned resources 1230 in subframe n+2.

Figure 13:
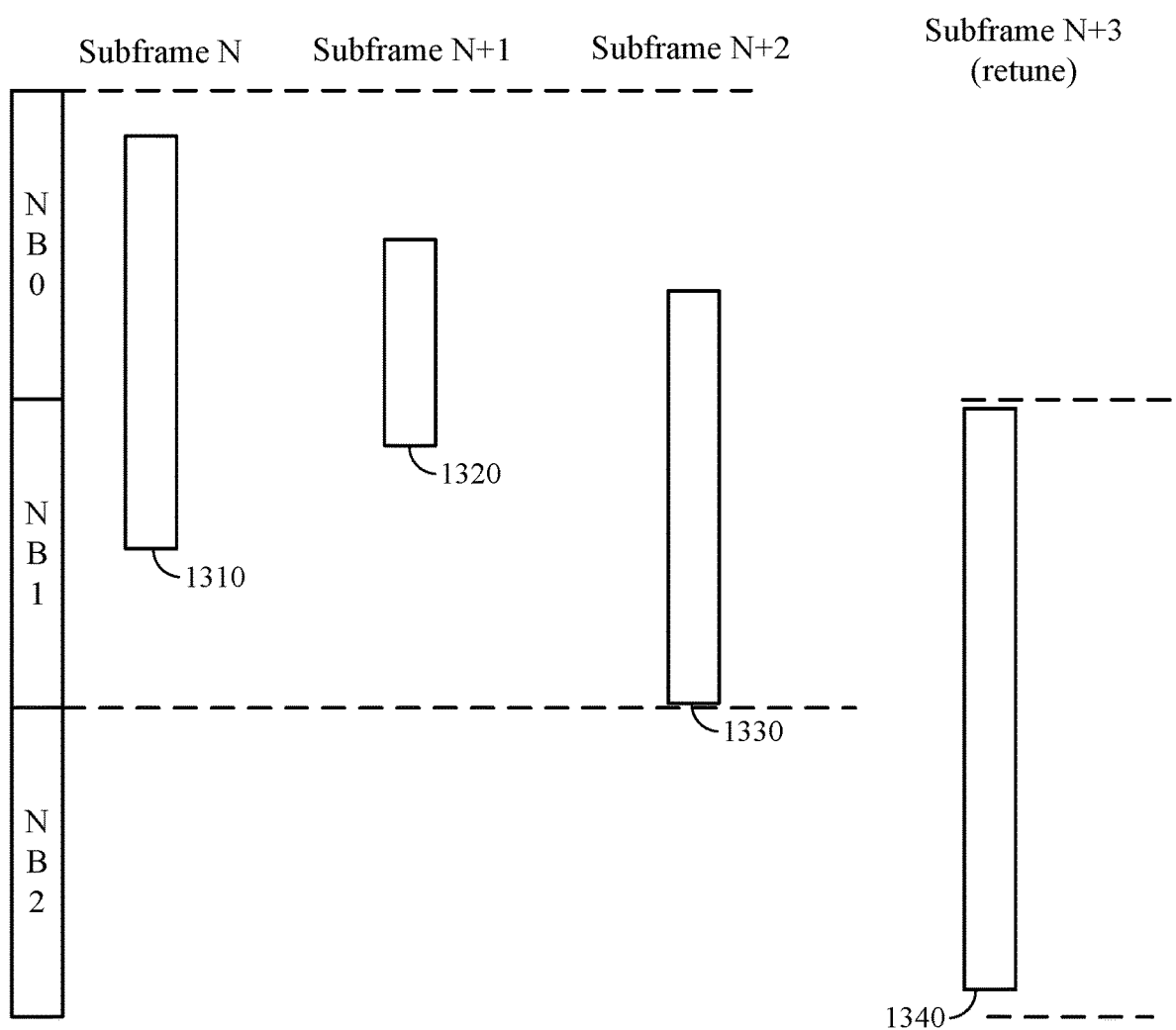

FIG. 13, as described above, illustrates an exemplary retuning rule specifying that retuning is applied if the assignment in subframe n+1 is not fully contained within the assignment in subframe n, in accordance with aspects of the present disclosure. Unlike FIG. 12, however, FIG. 13 illustrates the application of the retuning rule while showing multiple narrowband regions (i.e., NB0, NB1, and NB2) for measuring whether the assignment in, for example, subframe n+1 is fully contained within the assignment in subframe n (i.e., if the set of narrowbands fully containing the assignment in subframe n+1 is contained within the set of narrowbands fully containing the assignment in subframe n).

For example, there is no retuning when the set of narrowbands (NB0 and NB1) fully containing assigned resources 1320 in subframe n+1, is contained within the set of narrowbands (NB0 and NB1) fully containing assigned resources 1310 in subframe n. However, there is retuning when, for example, the set of narrowbands (NB1 and NB2) fully containing assigned resources 1340 in subframe n+3, is not contained within the set of narrowbands (NB0 and NB1) fulling containing assignment 1330 in subframe n+2.

Figure 14:
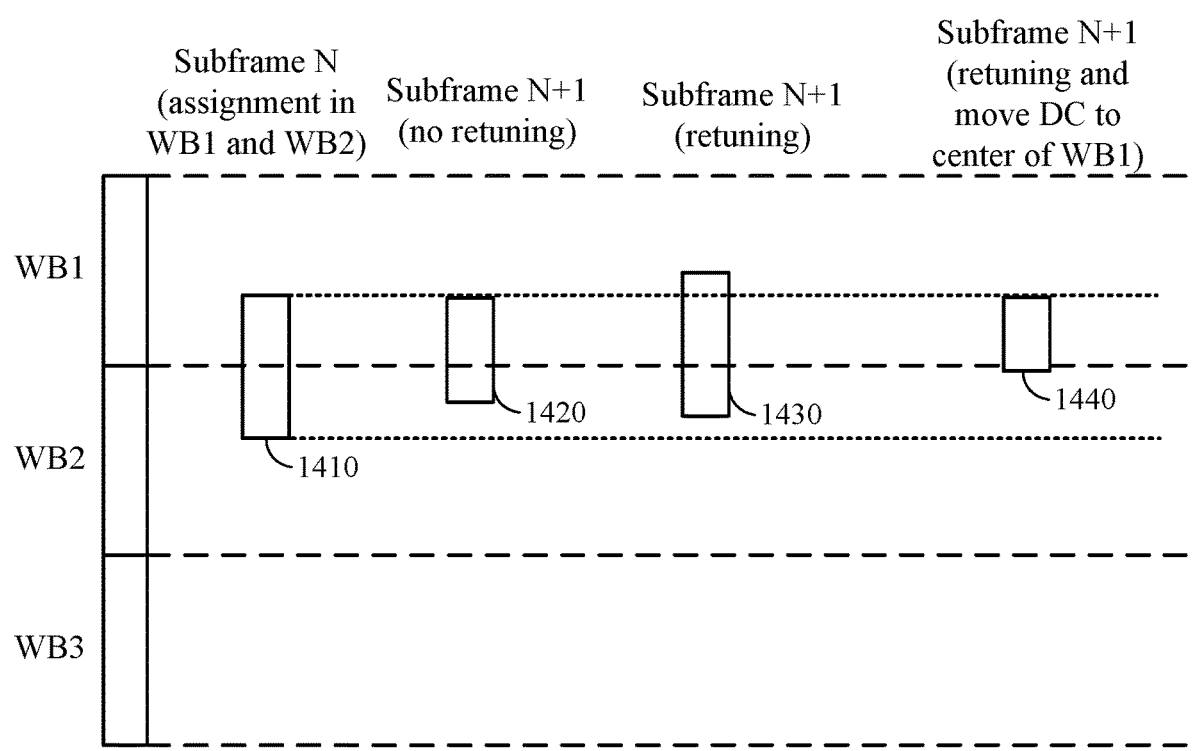

FIG. 14 illustrates an example retuning rule, which may require retuning depending on whether or not the assignment in subframe n and the assignment in subframe n+1 use more than one wideband, in accordance with aspects of the present disclosure. The retuning rule specifies that if the assignment in subframe n uses only one wideband region, then retuning should be applied using the retuning rules described in FIG. 11A. That is, no retuning is required if assignments in subframes n and n+1 are contained within the same wideband region; otherwise apply retuning. Now moving to embodiments where the assignment in subframe n uses more than one wideband region, the retuning rule of FIG. 14 specifies that retuning is applied under two scenarios. Under the first scenario, the assignment in subframe n+1 is not contained in the wideband of the assignment in subframe n. Under the second scenario, the set of wideband regions used in subframe n+1 are different than the set of wideband regions used in subframe n. For example, assigned resources 1440 in subframe n+1 are contained within WB1, which is different than the set of wideband regions (WB1 and WB2) containing assigned resources 1410 in subframe n, also resulting in moving the DC to the center frequency of WB1.

Figure 15:
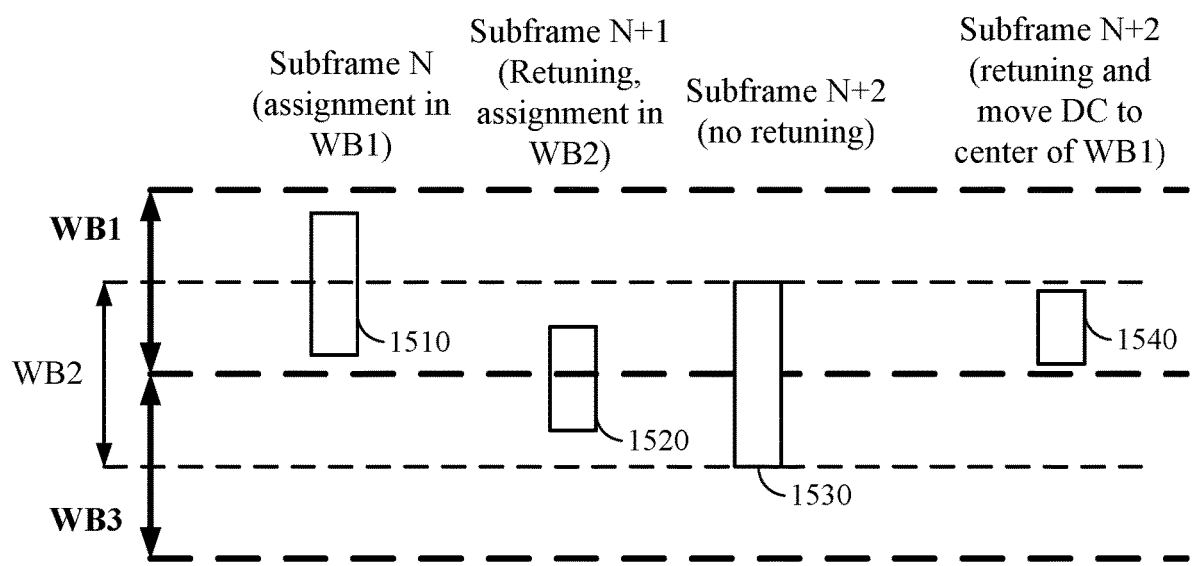

FIG. 15 illustrates an exemplary retuning rule for a set of wideband regions defined only for retuning purposes, in accordance with aspects of the present disclosure. The retuning rule specifies that the UE is considered to be operating in the wideband that fully contains the assignment. As an example, assigned resources 1510 in subframe n are fully contained by WB1 and, therefore, the UE is considered to be operating in WB1. Accordingly, retuning is performed when assigned resources 1520 in the subsequent subframe n+1 are fully contained in WB2 because the UE's operating wideband changes to WB2. Assigned resources 1530 in subframe n+2 do not result in retuning because, similar to assigned resources 1520, they are fully contained within WB2 and, therefore, the operating wideband does not change.

If, however, multiple widebands fully contain the assignment, in some embodiments, one of them may be picked as the operating bandwidth based on one or more defined rules. For instance, FIG. 15 shows three wideband regions, WB1, WB2, and WB3, some of which are overlapping (e.g. WB2 is overlapping with WB1 and WB3). Each wideband region may comprise a set of narrowband regions (e.g. WB1= [NB0–NB3], WB2=[NB2–NB5], and WB3=[NB4–NB7]). In some embodiments, one defined rule for choosing an operating bandwidth may specify that if an assignment is fully contained in multiple widebands, the wideband with the lowest (or largest) index number will be selected. For instance, if an assignment is contained in NB2, which is a narrowband region within both WB1 and WB2, then WB1 may be picked as the operating wideband based on the defined rule above. After an operating wideband is picked, the retuning rule above specifies that retuning is applied by the UE if the operating wideband in subframes n and n+1 are different. For example, assigned resources 1540 in subframe n+2 result in retuning because they are fully contained within two widebands WB1 and WB2 and, therefore, WB1 is picked based on the defined rule described above. As a result, retuning is performed from subframe n+1 to subframe n+2.

Figure 16A:
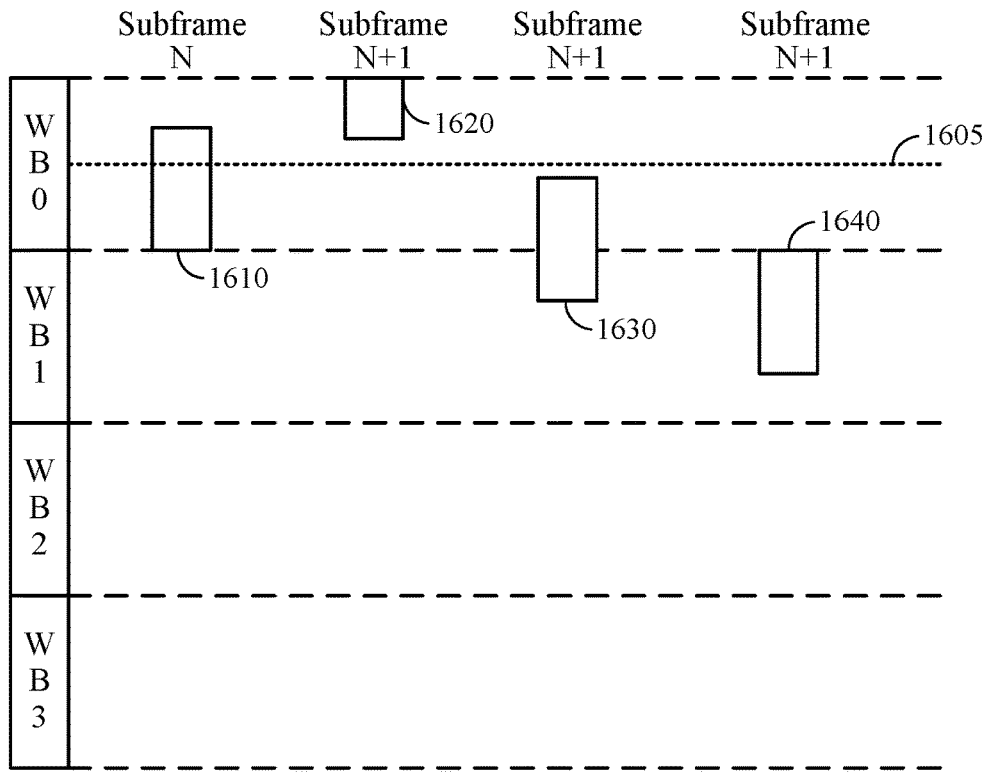
Figure 16B:
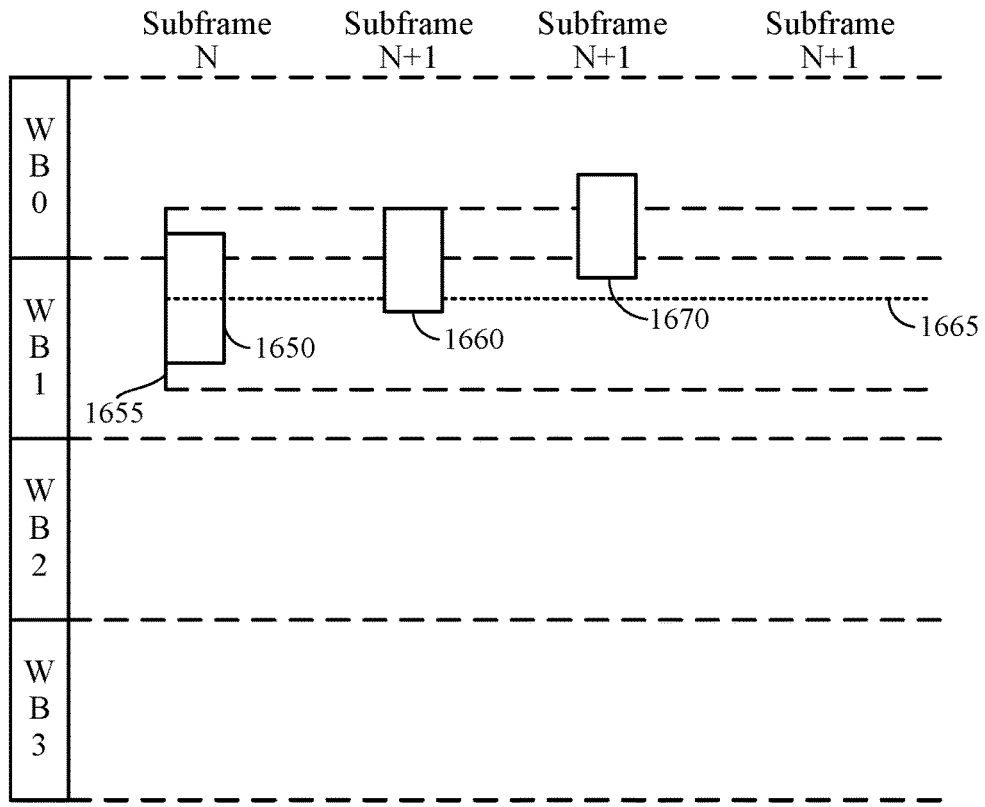

FIGS. 16A and 16B illustrate another example of a retuning rule for a set of wideband regions defined only for retuning purposes. FIGS. 16A and 16B both show four wideband regions, where each wideband region may be 5 MHz and comprise a set of narrowband regions (e.g. WB0=[NB0-NB3], WB1=[NB4-NB7], WB2=[NB8-NB11], and WB3=[NB12-NB15]). The retuning rule specifies that if the assignment in subframe n is contained within only one wideband region, as shown in FIG. 16A, then retuning may be applied using the retuning rules described in FIG. 11A. For example, as shown in FIG. 16A, if an assignment, such as the PUSCH resource allocation (i.e., resources 1610) is within a 5 MHz defined wideband region (e.g., WB0) in subframe n, the center frequency of the transmission bandwidth is center frequency 1605 of the defined wideband region (e.g., WB0). Accordingly, no retuning is required if assignments in subframes n and n+1 are contained within the same wideband region (e.g., WB0); otherwise apply retuning. For example, there is no retuning if resources allocated in subframe n+1 are within the same wideband region as the resources allocated in subframe n. An example of this is shown by FIG. 16A where no retuning is performed when resources (i.e., resources 1620) are allocated in subframe n+1 within the same wideband region WB0. However, when one or more of the PRBs of the allocated resources in subframe n+1 are in a different wideband region, retuning is performed. For example, as shown in FIG. 16A, one or more PRBs of resources 1630 and 1640 are in wideband region WB1, which may result in retuning.

The retuning rule of FIGS. 16A and 16B further indicates that if the assignment in subframe n uses more than one wideband region, as shown in FIG. 16B, there is no retuning if the assignment in subframe n+1 is contained within the 5 MHz wideband region with a center frequency that is in the center of the assignment in subframe n (as described above in relation to FIG. 10). For example, as shown in FIG. 16B, if an assignment, such as the PUSCH resource allocation, spans two defined 5 MHz widebands (e.g., WB0 and WB1) in subframe n, the center frequency of the transmit bandwidth (i.e., transmit bandwidth 1655) is in the center frequency 1665 of the PUSCH resource allocation 1650. As a result, in such embodiments, there is no retuning when the resource allocation in subframe n+1 is contained within the 5 MHz wideband region 1655 with a center frequency that is the same as the center frequency 1665 of PUSCH resource allocation 1650. However, there is retuning when the resource allocation in subframe n+1 is not contained within the 5 MHz wideband region 1655. For example, FIG. 16B shows resource 1670 that are not contained within wideband region 1655 and, therefore, retuning is performed in such an example.

In addition to the retuning rules discussed in relation to FIGS. 9 through 16, in some embodiments, a set of retuning rules may be defined for a 5 MHz-capable UE operating in different bandwidth ("BW") modes. In some embodiments, a 5 MHz capable UE may operate in two BW modes, a single BW mode or a multiple BW mode. In a single BW mode, the UE always transmits signals using a 5 MHz bandwidth mode in uplink transmissions, even if the allocated bandwidth is much smaller. In a single bandwidth mode, in some embodiments, all the retuning rules discussed in relation to FIGS. 9 through 16 may be applied.

Moving now to a multiple BW mode, in a multiple BW mode the UE transmits signals in different BW modes depending on the resource allocation. In some embodiments, the BW modes may be restricted to be selected from the bandwidths supported in LTE/eMTC (1.4 Mhz, 3 Mhz, 5 MHz etc.). For example, if 6RBs are allocated, a 1.4 MHz mode may be used, and if 20 RBs are allocated, a 5 Mhz mode may be used. In some embodiments, this may provide some power savings at UE when the UE has smaller allocations.

For retuning purposes, in some embodiments, multiple widebands (e.g. including potentially overlapping widebands) may be defined for each supported wideband mode. As discussed above, in some embodiments, the supported BWs may be selected from those supported in LTE. In some embodiments, the wideband (specified by the wideband BW and the wideband index within that BW) used for a given transmission may be selected by the UE based on the resource allocation/information received from the DCI (i.e. downlink control information) through some predefined rules. For example, in some embodiments, an UE may use the wideband with the smallest bandwidth that fully accommodates the allocated resources. In some embodiments, if the wideband selected, as described above, changes across subframes, then the retuning rules of FIGS. 9-16 may apply, whereby one or more symbol durations may be potentially dropped. In some embodiments, the retuning rules may be relaxed such that no symbol durations are dropped if the wideband change leads to a reduction in BW and the new wideband is fully contained within the previous wideband in the previous subframe.

In some embodiments, the UE may perform BW mode optimization with frequency hopping. Because of frequency hopping, when transmitting multiple repetitions of the same packet, the frequency resources used by the UE may change across subframes. If the change in the frequency resources leads to a change in the wideband, in some embodiments, the UE may retune and, as a result, lose one or more symbol durations. However, in some embodiments, since the UE may be aware of the frequency hopping pattern, while performing the first transmission the UE may determine whether utilizing a larger BW mode avoids retuning. In such embodiments, the UE may then use the larger BW mode instead of using a smaller BW mode, which may require retuning.

In some embodiments, the same retuning rules described above in relation to 5 MHz-capable UE devices may be applied to above-5 MHz capable devices operating in MTC mode (e.g. eMTC). Although 3GPP's LTE Rel-14 for MTC devices only supports max 5 MHz PUSCH transmissions in UL, in some embodiments, some UEs may support larger BW (for example smartphones supporting 20 MHz BW) operations in MTC mode.

In some embodiments, different retuning rules may apply to above-5 MHz capable devices operating in MTC mode. For instance, retuning may not be required for a 20 MHz-capable UE. This is because a 20 MHz-capable UE is able to open up the 20 MHz BW and thus may not need retuning gaps even if the 5 MHz wideband changes across subframes.

As discussed above, with respect to transmissions under FDD, a UE may not perform SRS transmissions when retuning is required. Accordingly, SRS transmission may be dropped in each of the embodiments discussed above, where retuning is required by the retuning rules.

Moving now to transmissions under TDD, as described above, Rel-13 specified that DL to UL switching (e.g. for an SRS transmission in UpPTS) may require retuning. This may be based on the assumption that there is a single PLL for UL and DL. With respect to dropping the SRS transmission, Rel-13 specified that a UE drops the SRS transmission in UpPTS if at least one RB utilized by SRS in UpPTS is different from the reception narrowband in DwPTS. However, as described above, in Rel-14, different maximum bandwidths may be configured for uplink and downlink transmissions. For example, a 1.4 MHz bandwidth may be used for uplink transmissions while a 5 MHz bandwidth may be used for downlink transmissions.

Accordingly, certain SRS dropping rules are described herein for application under Rel-14. If the bandwidth of UL and DL are the same, in some embodiments, a rule may specify that the SRS be dropped if retuning is required. In some other embodiments, if the bandwidth of the UL and DL are different, one rule may specify that SRS always be dropped. Another rule may specify that SRS be dropped depending on the position of the SRS in UpPTS and/or the retuning capability of the UE. For example, if SRS is transmitted in the last symbol of a 6-symbol UpPTS, SRS is transmitted. However, if SRS is on the first symbol, SRS is dropped. In another example, if the UE needs less than 2 symbol durations for retuning (e.g. 1 symbol duration or 0 symbol duration), SRS is always transmitted.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for multiplexing, and/or means for applying may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
    determining first resources assigned to the UE in a first subframe and second resources assigned to the UE for uplink transmissions in a second subframe, wherein the first subframe is different than the second subframe;
    determining whether to retune radio frequency (RF) circuitry prior to transmitting in the second subframe based on at least one rule involving an overlap between the first resources and second resources; and
    retuning the RF circuitry prior to transmitting in the second subframe upon determining to retune based on the at least one rule.

2. The method of claim 1, wherein:
    the first resources are assigned to the UE for downlink or uplink transmissions in a first bandwidth in the first subframe;
    the second resources are assigned to the UE for uplink transmissions in a second bandwidth in the second subframe; and
    the rule indicates the UE is to retune prior to transmitting in the second subframe if the first and second bandwidths are different.

3. The method of claim 1, wherein:
    the first resources are assigned to the UE for downlink or uplink transmissions in a first bandwidth in the first subframe;

the second resources are assigned to the UE for uplink transmissions in a second bandwidth in the second subframe; and the rule indicates the UE is not to retune if the first and second bandwidth have a same center frequency.

4. The method of claim 1, wherein:

the first resources are within a first wideband region that includes a set of narrowband regions; and the rule indicates the UE is to retune prior to transmitting in the second subframe if the second resources are not contained within the first wideband region.

5. The method of claim 4, wherein the rule indicates that the UE is to retune if at least one physical resource block (PRB) of the first resources falls within a different wideband region than at least one PRB of the second resources.

6. The method of claim 1, wherein:

one or more physical resource blocks (PRBs) of the first resources occupy at least a part of a first wideband region and at least a part of a second wideband region; and the rule indicates the UE is to retune prior to transmitting in the second subframe if the second resources are not contained within a third wideband region with a same center frequency as the first resources.

7. The method of claim 6, wherein the third wideband region has a 5 MHz bandwidth.

8. The method of claim 1, wherein:

the rule indicates the UE is to retune prior to transmitting in the second subframe if the second resources are not entirely contained within the first resources.

9. The method of claim 8, wherein:

the first resources occupy a first set of one or more narrowbands;

the second resources occupy a second set of one or more narrowbands; and the rule indicates that the UE is to retune if the second set of narrowbands is not contained within the first set of narrowbands.

10. The method of claim 8, wherein:

the first resources occupy a first set of one or more wideband regions, each spanning a set of narrowbands;

the second resources occupy a second set of one or more wideband regions, each spanning a set of narrowbands; and the rule indicates that the UE is to retune if the second set of wideband regions is not contained within the first set of wideband regions.

11. The method of claim 1, wherein:

the first resources occupy a first set of one or more wideband regions, each spanning a set of narrowbands;

the second resources occupy a second set of one or more wideband regions, each spanning a set of narrowbands; and the rule indicates that the UE is to retune if the first set of wideband regions is different than the second set of wideband regions.

12. The method of claim 1, wherein:

the first resources are entirely contained within at least two different wideband regions in the first subframe, wherein each wideband region spans a set of narrowbands and one of the wideband regions is selected as an operating wideband for the first subframe;

the second resources are entirely contained within at least two different wideband regions in the second subframe, wherein each wideband region spans a set of narrowbands and one of the wideband regions is selected as an operating wideband for the first subframe; and the rule indicates that the UE is to retune if the operating wideband of the second subframe is different than the operating wideband of the first subframe.

13. The method of claim 12, wherein a wideband region having a lower index is selected as the operating wideband for each subframe.

14. The method of claim 1, further comprising:

selecting a bandwidth operating mode of the UE based, at least in part on the rule.

15. The method of claim 14, wherein the bandwidth operating mode is selected in an effort to reduce an amount of retuning.

16. The method of claim 1, wherein:

the rule indicates that, if resources needed for a sounding reference signal (SRS) in the second subframe would result in retuning, the SRS is not transmitted.

17. The method of claim 1, wherein:

upon determining to retune the RF circuitry, one or two symbol durations are used by the UE for retuning, during which no signals are transmitted.

18. An apparatus for wireless communications, comprising:

a transmit processor configured to determine first resources assigned to the UE in a first subframe, to determine second resources assigned to the UE for the uplink transmissions in a second subframe, wherein the first subframe is different than the second subframe, to apply at least one rule involving an overlap between the first resources and second resources, the at least one rule being used by the transmit processor to determine whether to retune radio frequency (RF) circuitry after uplink transmissions in the first subframe and prior to uplink transmissions in the second subframe; and a circuit in the RF circuitry that is configured to be retuned by the transmit processor prior to uplink transmissions in the second subframe if the transmit processor determines to retune the RF circuitry.

19. The apparatus of claim 18, wherein:

the first resources are assigned to the UE for downlink or uplink transmissions in a first bandwidth in the first subframe;

the second resources are assigned to the UE for uplink transmissions in a second bandwidth in the second subframe; and the rule indicates the UE is to retune prior to transmitting in the second subframe if the first and second bandwidths are different.

20. The apparatus of claim 18, wherein:

the first resources are assigned to the UE for downlink or uplink transmissions in a first bandwidth in the first subframe;

the second resources are assigned to the UE for uplink transmissions in a second bandwidth in the second subframe; and the rule indicates the UE is not to retune if the first and second bandwidth have a same center frequency.

21. The apparatus of claim 18, wherein:

the first resources are within a first wideband region that includes a set of narrowband regions; and the rule indicates the UE is to retune prior to transmitting in the second subframe if the second resources are not contained within the first wideband region.

22. The apparatus of claim 21, wherein the rule indicates that the UE is to retune if at least one physical resource block (PRB) of the first resources falls within a different wideband region than at least one PRB of the second resources.

23. The apparatus of claim 18, wherein:
one or more physical resource blocks (PRBs) of the first resources occupy at least a part of a first wideband region and at least a part of a second wideband region; and
the rule indicates the UE is to retune prior to transmitting in the second subframe if the second resources are not contained within a third wideband region with a same center frequency as the first resources.

24. The apparatus of claim 23, wherein the third wideband region has a 5 MHz bandwidth.

25. The apparatus of claim 18, wherein:
the rule indicates the UE is to retune prior to transmitting in the second subframe if the second resources are not entirely contained within the first resources.

26. The apparatus of claim 25, wherein:
the first resources occupy a first set of one or more narrowbands;
the second resources occupy a second set of one or more narrowbands; and
the rule indicates that the UE is to retune if the second set of narrowbands is not contained within the first set of narrowbands.

27. The apparatus of claim 25, wherein:
the first resources occupy a first set of one or more wideband regions, each spanning a set of narrowbands;
the second resources occupy a second set of one or more wideband regions, each spanning a set of narrowbands; and
the rule indicates that the UE is to retune if the second set of wideband regions is not contained within the first set of wideband regions.

28. The apparatus of claim 18, wherein:
the first resources occupy a first set of one or more wideband regions, each spanning a set of narrowbands;
the second resources occupy a second set of one or more wideband regions, each spanning a set of narrowbands; and
the rule indicates that the UE is to retune if the first set of wideband regions is different than the second set of wideband regions.

29. The apparatus of claim 18, wherein:
the first resources are entirely contained within at least two different wideband regions in the first subframe, wherein each wideband region spans a set of narrowbands and one of the wideband regions is selected as an operating wideband for the first subframe;
the second resources are entirely contained within at least two different wideband regions in the second subframe, wherein each wideband region spans a set of narrowbands and one of the wideband regions is selected as an operating wideband for the first subframe; and
the rule indicates that the UE is to retune if the operating wideband of the second subframe is different than the operating wideband of the first subframe.

30. The apparatus of claim 29, wherein a wideband region having a lower index is selected as the operating wideband for each subframe.

31. The apparatus of claim 18, further comprising:
selecting a bandwidth operating mode of the UE based, at least in part on the rule.

32. The apparatus of claim 31, wherein the bandwidth operating mode is selected in an effort to reduce an amount of retuning.

33. The apparatus of claim 18, wherein:
the rule indicates that, if resources needed for a sounding reference signal (SRS) in the second subframe would result in retuning, the SRS is not transmitted.

34. The apparatus of claim 18, wherein:
upon determining to retune the RF circuitry, one or two symbol durations are used by the UE for retuning, during which no signals are transmitted.

35. An apparatus for wireless communications, comprising:
a means for determining first resources assigned to the UE in a first subframe and second resources assigned to the UE for uplink transmissions in a second subframe, wherein the first subframe is different than the second subframe;
a means for determining whether to retune radio frequency (RF) circuitry prior to transmitting in the second subframe based on at least one rule involving an overlap between the first resources and second resources; and
a means for retuning the RF circuitry prior to transmitting in the second subframe upon determining to retune based on the at least one rule.

36. The apparatus of claim 35, wherein:
the first resources are within a first wideband region that includes a set of narrowband regions; and
the rule indicates the UE is to retune prior to transmitting in the second subframe if the second resources are not contained within the first wideband region.

37. The apparatus of claim 35, wherein:
one or more physical resource blocks (PRBs) of the first resources occupy at least a part of a first wideband region and at least a part of a second wideband region; and
the rule indicates the UE is to retune prior to transmitting in the second subframe if the second resources are not contained within a third wideband region with a same center frequency as the first resources.

* * * * *